June 19, 1951
J. E. BURTON ET AL
2,557,905
ELECTRIC HEATING CONTROL
Filed Sept. 6, 1946
2 Sheets—Sheet 1
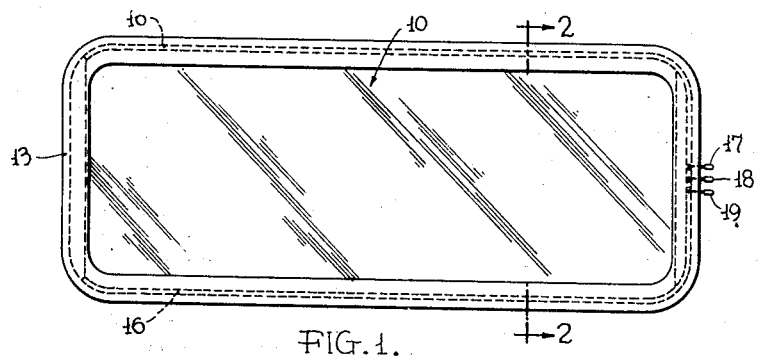
FIG. 1.
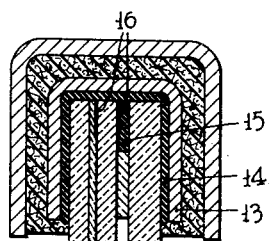
FIG. 2.
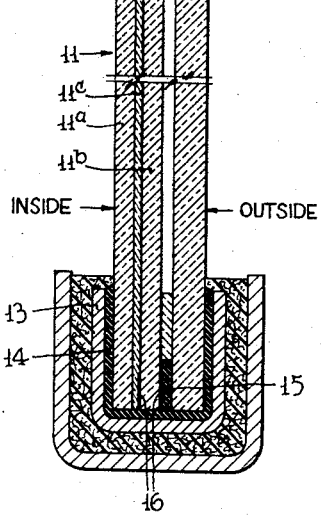
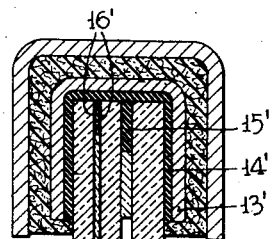
FIG. 3.
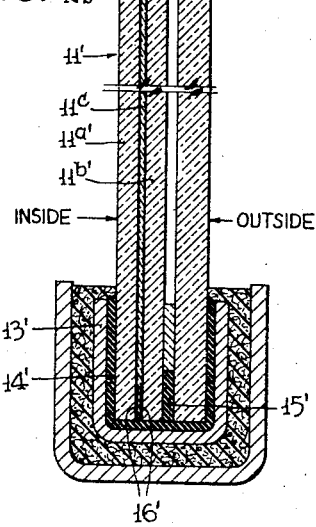
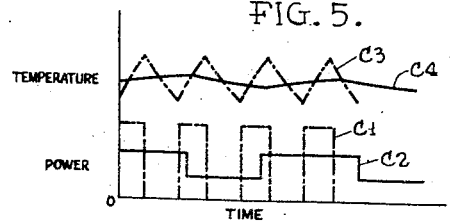
FIG. 5.
INVENTORS
John E. Burton &
Edwin M. Callender,
BY
ATTORNEY

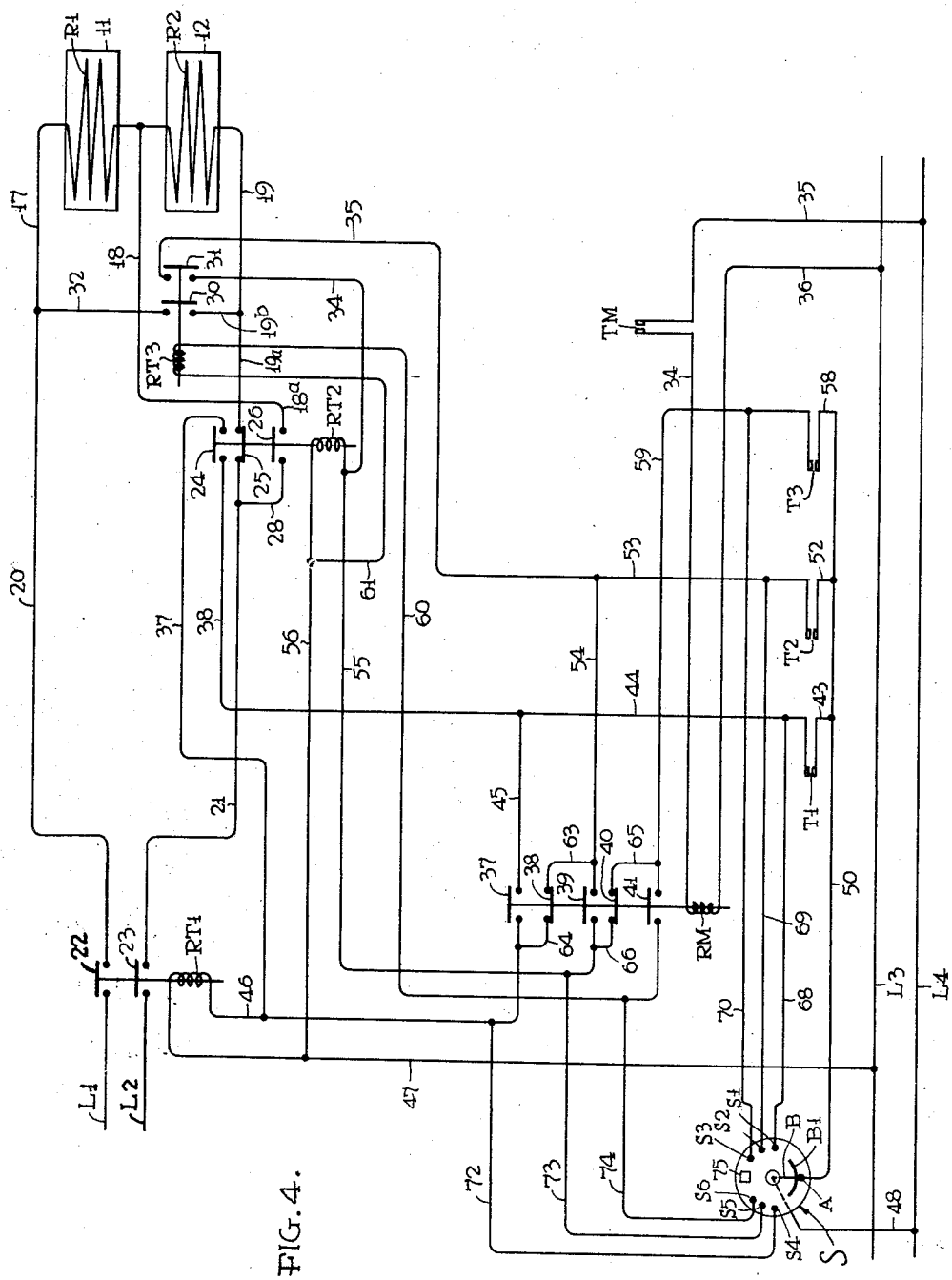

Patented June 19, 1951

2,557,905

UNITED STATES PATENT OFFICE 2,557,905

ELECTRIC HEATING CONTROL

John E. Burton, Philadelphia, and Edwin M. Callender, Cynwyd, Pa., assignors to The Budd Company, Philadelphia, Pa., a corporation of Pennsylvania Application September 6, 1946, Serial No. 695,172

2 Claims. (Cl. 219—20)

This invention relates to electrically heated panels and has for an object the provision of improvements in this art.

One of the particular objects is to provide heating current for one or more electrically heated panels which is proportioned by means of novel control circuits according to temperature demands, specifically being increased or decreased in increments inversely to the temperature, whereby with a constant voltage source a relatively uniform temperature is maintained at the panels.

Another object is to provide a plurality of heating elements on a panel and to supply them with current in such manner that the required temperatures are maintained without over-heating the resistance elements.

Another object is to provide a plurality of resistance elements, each of which heats the panel uniformly over its entire surface area.

Another object is to provide for a transparent panel such as a window, a plurality of heating elements which heat uniformly over the entire surface area but without obstructing vision through the window, specifically to provide very thin transparent resistance heating films for each window and novel circuits for controlling the supply of current thereto.

Another object is to provide means for automatically changing the resistance characteristics of a circuit according to temperature demands and by use solely of the resistances provided by the heating elements, thus avoiding the loss of power involved in using control rheostat resistances and the like.

Another object is to modulate the heat in blocks according to demand to decrease instead of wholly cutting off the heat when the demand is satisfied.

Another object is to use a resistance heating film of the reflective loss reducing type for reducing radiant heat losses through a window and in particular to reduce radiant heat losses from an interiorly disposed panel heating means.

The above and other objects and advantages of the invention will be apparent from the following description of certain exemplary embodiments thereof, reference being made to the accompanying drawings, wherein:

Fig. 1 is an elevation of a panel, such as a rail car window, embodying the invention;

Fig. 2 is a section taken on the line 2—2 of Fig. 1 showing one arrangement of panes and heating elements;

Fig. 3 is a section like Fig. 2 but showing a modified form;

Fig. 4 is a circuit diagram; and

Fig. 5 is a graphic diagram of the power demand curves of the present invention as compared with prior practice.

The invention will be described specifically in connection with the windows of passenger vehicles, such as for example, rail cars, which are provided with transparent metallic resistance heating films but this is not to be taken as a limitation on the broader aspects of the invention, as the same is applicable to other types of enclosures, to other types of panels desired to be heated, and to panels having other types of resistance heating elements, for example, wire resistance elements mounted upon the surfaces of the panel or embedded in or placed between laminated sheets as is well known in the art. Also, while only two resistance heating elements are shown, it is to be understood that the present invention is applicable to more than two such elements.

The window panel 10 includes one or more panes or sheets 11, 12 mounted in a frame 13 with resilient material 14 such as rubber therebetween to absorb shock and provide all necessary movements of the panes without damage or breakage.

When double spaced panes are used, as is preferred, they may be held apart and sealed together around the periphery by a resilient sealing strip such as rubber 15.

One of the panes, as 11, which faces the interior of the vehicle, may be of the duplate safety type comprising laminae 11a, 11b secured together by an intervening transparent plastic sheet 11c.

The panel to be heated is provided with a plurality of resistance elements R1 and R2, which preferably, for transparent windows, are in the form of transparent metallic or other resistance films of extreme thinness which cover the entire surface area of the pane or panes to be heated.

Bus strips 16 are provided for each resistance element and current leads 17, 18 and 19 extend from these bus strips. The lead 18 is common to two bus bars, one for each resistance element, and lead 17 is individual to one resistance element and 19 is individual to the other resistance element.

In Fig. 2 the resistance elements R1, R2 and bus strips 16 are shown to be located on the opposite faces of the outer lamina 11b of the inner pane 11 and in Fig. 3 the resistance elements R1', R2' and bus strips 16' are shown to be mounted on opposite sides of the plastic sheet between the laminae 11a', 11b' of the inner pane 11.

In both cases the resistance elements are located where they furnish more heat toward the inside of the vehicle or other enclosure than toward the outside. They are also located where they will be protected by one or more transparent sheets of insulating material. Even a thin lacquer coating will be sufficient as the heating is not very high, usually not above 150° F., and is widely distributed over the whole window surface. Likewise the voltage is relatively low to avoid all possibility of injury or damage in case a window should be broken.

In the Fig. 2 construction, the outer reflecting film R2 acts to restrict the emergence of radiant heat rays from the pane 11b, i. e., to prevent emission from the outer surface of 11b. Its reflecting effect is present at all times as regards radiant heat rays travelling outward, particularly those caused by the heating element R1.

Means are provided for utilizing the resistance elements R1, R2 for changing the power in different ranges for different degrees of outside temperature, the control for this being selectively either manual or automatic according to thermostat response to prevailing temperatures outside of the vehicle or other enclosure. The control means is illustrated in the circuit diagram of Fig. 4.

Here the resistance elements R1, R2 and their leads 17, 18, 19 are shown to be connectible in various ways with the power lines 20, 21, which lines are connectible by switches 22, 23 of a relay RT1, respectively, with outside power lines L1, L2 of a constant potential source, such as for example, a storage battery.

With this constant potential source it will be seen that if the resistance elements R1, R2 are connected in series the lowest heating effect will be realized; that if one resistance element is connected in circuit alone a greater heating effect will be realized; and that if both resistance elements are connected in parallel the greatest heating effect will be realized. Means are provided to do this selectively, either manually or automatically. The immediate means comprises the relay switch RT1, already mentioned for making the series connection, a relay switch RT2 for making the single connection, and the relay switch RT3 for making the parallel connection.

The relay RT2 has switches 24 and 26 which are normally open and a switch 25 which is normally closed when the relay coil is deenergized. Lead 19a runs from one terminal of the switch 25 to a connection with lead 19 of the resistance element R2. Lead 28 runs from one terminal of switch 26 to the power lead 21, and a lead 18a runs from the other terminal of switch 26 to the common lead 18 between the two resistance elements R1, R2.

The relay RT3 has switches 30, 31 which normally are in open circuit position when the relay coil is deenergized. Lead 19b runs from one terminal of switch 30 to lead 19 of resistance R2, and a lead 32 runs from the other terminal of switch 30 to the power lead 20.

Means are provided for controlling the circuit in response to temperature conditions, either according to outside or inside temperatures or both or manually to supply power in successive increments or blocks and to drop it off in the same way. In this way the fluctuations caused by cutting the power off completely and restoring it in full amount at a single step are avoided.

The control means here shown comprise thermostatically operated switches T1, T2 and T3 which are set to operate in response to different temperatures outside the vehicle or other enclosure, for example, 70° F., 50° F., and 25° F., respectively, and an inside thermostatically operated switch or modulator TM set to operate at any desired temperature, for example 70° F., prevailing within the vehicle or at that surface of the window which faces the interior of the vehicle. These switches are hereinafter designated as thermostats.

In addition, a hand operated switch S is provided for initiating operation or for hand control alone or for a mixed hand and automatic control. Control current is supplied by lines L3 and L4. The settings may be made anything desired either as constructed or by later adjustment and the three thermostats T1, T2 and T3 may be made as a single combined instrument.

The modulating thermostat TM controls the operation of a modulating relay RM, through a circuit from control lines L3, L4, leads 34, 35 and 36 and the coil of relay RM. Relay RM is provided with switches 37, 38, 39, 40 and 41, the switches 38 and 40 being normally closed and the switches 37, 39 and 41 being normally open when the relay coil is deenergized.

Switch S has an automatic control contact A which is connectible with control line L4 through lead 48 and switch blade B. Contact A is connected to an automatic control lead 50 which is common to thermostats T1, T2 and T3. Thermostat T1 controls the operation of relay RT1 through a circuit which comprises L4, 48, B, A, 50, lead 43, thermostat T1, leads 44 and 45, relay switch 37, lead 46, coil of relay RT1 and lead 47 to L3.

Thermostat T2 controls the operation of relay RT2 through a circuit which comprises L4, 48, B, A, 50, 52, T2, 53 and 54, switch 39, lead 55, the coil of relay RT2 and leads 56, 47 to L3.

Thermostat T3 controls the operation of relay RT3 through a circuit which comprises L4, 48, B, A, 50, 58, thermostat T3, lead 59, switch 41, lead 60, the coil of relay RT3 and leads 61, 56 and 47 to L3.

Means are thus provided for decreasing the power to the next lower amount than that required by the lowest temperature outside thermostat which has been closed when the inside temperature rises to the predetermined amount for which the modulating thermostat TM is set. When the inside temperature adjacent the inside surface of the window drops below the temperature for which the thermostat TM is set, say below 70° F., the contacts of thermostat TM close and the coil of relay RM is energized. This closes switches 37, 39 and 41 and opens switches 38 and 40. The normal operation for heating under the control of outside thermostats T1, T2 or T3 has already been described. When the temperature requirement is satisfied the thermostat TM opens, opening switches 37, 39 and 41 and closing switches 38 and 40. Switch 38, by a lead 63 to the lead 54 of thermostat T2 and a lead 64 to the lead 46 of relay RT1, causes relay RT1 to be energized when thermostat T2 is closed, thus reducing the amount of heat when the correct inside temperature is attained. Switch 40, by a lead 65 to the lead 59 of thermostat T3 and a lead 66 to the lead 55 of relay RT2, causes relay RT2 to be energized when T3 is closed, thus reducing the amount of heat when the correct inside temperature is attained. In both instances this produces a close control over the required heat.

The effect of this is to alternate between one block of power and zero power when thermostat T1 alone is closed; to alternate between two blocks of power and one block of power when thermostats T1 and T2 are closed; and to alternate between three blocks of power and two blocks of power when all of the thermostats T1, T2 and T3 are closed. Thus at no time is the power varied more than one block at a time.

Means are provided for operating conjointly by the modulating thermostat TM and manual control and without regard to the action of the outside thermostats T1, T2 and T3. The means here provided comprises the manual control switch blade B which is provided with a long arcuate arm B1 adapted to move over and finally cover the contacts S1, S2, S3 of switch S, thus connecting them successively and cumulatively with lead 48 and control line L4. These contacts are connected respectively, by leads 68, 69 and 70, with leads 44, 53 and 59 of thermostats T1, T2 and T3 respectively. The effect of this is to shunt out the thermostats T1, T2 and T3 and produce their effect by the hand operated switch S. The group of contacts S1, S2 and S3 is spaced sufficiently far from contact A and other contacts of switch S so that the blade B1 does not engage any other contacts while engaging this group. The long blade B1 is effective in the same way as thermostats T1, T2 and T3 which stay closed after they have once closed and until the temperature again rises to the point where they open. The relay hold-in switches 24 and 31 provide additional assurance of cumulative operation of the relays RT1, RT2 and RT3 in the demand (closed) position of modulating thermostat TM when the modulating relay RM is energized. The circuit is operative without these hold-in switches 24, 31 by reason of the action of thermostats T1, T2 and T3 or of the long switch blade B1 but their use provides added assurance of proper operation.

Means are provided for operating entirely under manual control and without modulation. These means here comprise contacts S4, S5 and S6 on switch S which are adapted to be engaged by the switch blade B1 when it moves in the other direction from the contact A for full automatic operation. These contacts are provided respectively with leads 72, 73 and 74 which connect respectively with leads 46, 55 and 60 of relays RT1, RT2 and RT3 respectively. As before, the long switch blade covers all three contacts when moved to final position but without at any time engaging other contacts while it is operating on this set. A stop 75 on switch S prevents improper movement of the switch arm B1. The effect of contacts S4, S5, S6 is to shunt out all of the thermostats T1, T2, T3 and TM and the modulating relay RM and to operate the relays RT1, RT2 and RT3 solely by the hand switch S and without regard to temperature demands. This is valuable for emergencies, as when the thermostats might be out of order or for heating rapidly after an unheated layover.

In operation, assuming the switch S to be set at contact A for automatic operation, the outside thermostat T1 to be set to close below 70° F., the outside thermostat T2 to be set to close below 50° F., the outside thermostat T3 to be set to close below 25° F., and the modulating thermostat TM to be set to close below 70° F., then as soon as the outside temperature falls below 70° F., the contacts of thermostat T1 close and remain closed for any temperature below 70° F. If thereafter the temperature falls below that for which the modulating thermostat is set, the contacts of the modulating thermostat TM close and the relays RM and RT1 are actuated. This movement of switches 22 and 23 to closed circuit position connects the supply of current to the resistance heating elements R1 and R2 in series. This is the lowest heating effect, a single block of power, and when the contacts of modulating thermostat TM open upon the satisfaction of the heat demand the power will be cut off entirely.

If the outside temperature drops below 50° F., the contacts of thermostat T2 close and remain closed. The contacts of thermostat T1 also remain closed. Closure of the modulating thermostat TM supplies power to resistance element R1 only. The operation of modulating thermostat TM now shifts power between two blocks and one block, relay RT2 being alternately energized and deenergized but relay RT1 remaining energized.

If the outside temperature drops below 25° F., the contacts of thermostat T3 close and remain closed. The contacts of thermostats T1 and T2 also remain closed. Closure of modulating thermostat TM thus causes the supply of power to the heating elements R1 and R2 in parallel. The operation of modulating thermostat TM now shifts power between three blocks and two blocks, relay RT3 being alternately energized and deenergized but relays RT1 and RT2 remaining energized.

Were the power applied and cut off without modulation the power curve in each instance would shift suddenly from maximum to zero and back, as represented by curve C1 in Figure 5. With modulation, however, the power curve takes the form of curve C2, with the result that the demand for power is less. In the case of temperature, were there no modulation, the temperature curve as shown by curve C3 would vary between wide limits during the periods of supply and non-supply of power, whereas with modulation, as shown by curve C4, the temperature curve tends to flatten out with the result that a closer temperature differential is attained with less operation of the modulating thermostat.

The operation of the selective hand control will be clear from the description already given of the apparatus and its effects.

It is to be understood that various other circuit arrangements may be utilized for controlling the supply of current to the plural resistance heating elements described in accordance with temperature ranges prevailing outside the vehicle or other enclosure, and that the modulating thermostat may respond to the surface temperature of the heated panels or to the temperature within the enclosure.

It is thus seen that the provision of a plurality of heating elements and improved means for energizing them in a selected manner provides improved heating effects and a conservation of power and equipment. The apparatus is very simple and reliable and provides dependable operation. The outside and inside thermostats may be provided as single units for a whole car, for one side only, for one compartment only, or various combinations of these and other arrangements as may be necessary or desirable.

While one embodiment of the invention has been described for purposes of illustration, it is to be understood that there may be various embodiments within the limits of the prior art and the scope of the subjoined claims.

What is claimed is:

1. Heating means for an enclosure, comprising in combination, a visually transparent window in a wall of said enclosure which separates the inside space thereof from the outside space, a plurality of separate electrical resistance heating units which are visually transparent disposed in a unit area of said window, said units being arranged in parallel in spaced relationship between inside and outside, a source of electric current for said heating units, circuit means between said source and units for supplying current to said units in different arrangements of units to furnish different amounts of heat from no heat to maximum heat, a first circuit control means including means responsive to temperatures outside the enclosure for setting up different arrangements of heating units by steps from no heat to maximum heat in accordance with higher to lower outside temperatures, and a second circuit control means including means responsive to temperatures inside the enclosure for shifting by one step the heating unit arrangements between the highest heating effect set up by the coldest prevailing outside temperature and the next lower heating effect corresponding to the next warmer outside temperature arrangement, whereby the full unit area is heated when heat is required and to the degree required by outside temperature with step control by inside temperature.

2. Heating apparatus for a compartment comprising in combination, a window having transparent panes with a plurality of heating elements spaced apart from inside to outside, all heating elements providing light transparency through the panes and the outer heating element comprising a transparent electrically-conductive metallic film disposed on the surface of a pane forming a retarding means for outwardly moving heat rays and being also transparent to visible light rays, means for supplying heating current to said elements in steps in response to temperatures outside the enclosure, and means for shifting by one step between adjacent steps in response to temperatures inside the enclosure, said current supply and shifting means always causing heating of an interior heating element and selectively causing heating of an outer heating element, the outer heating element in all cases acting to limit the outward passage of heat rays.

JOHN E. BURTON.
EDWIN M. CALLENDER.

REFERENCES CITED

The following references are of record in the file of this patent:

UNITED STATES PATENTS

| Number | Name | Date |
|---|---|---|
| 987,293 | Gale | Mar. 21, 1911 |
| 1,117,128 | Camm | Nov. 10, 1914 |
| 1,146,879 | Hynes | July 20, 1915 |
| 1,232,598 | Norstrom et al. | July 10, 1917 |
| 1,437,142 | Heckman | Nov. 28, 1922 |
| 1,438,635 | Colby | Dec. 12, 1922 |
| 1,451,539 | Forshee | Apr. 10, 1923 |
| 1,631,484 | Hudson | June 7, 1927 |
| 1,658,692 | Shroyer | Feb. 7, 1928 |
| 1,798,678 | Keller | Mar. 31, 1931 |
| 1,932,269 | Harrington | Oct. 24, 1933 |
| 2,062,337 | Stewart | Dec. 1, 1936 |
| 2,168,680 | Nordgren | Aug. 8, 1939 |
| 2,300,560 | Faber | Nov. 3, 1942 |
| 2,376,482 | Guler et al. | May 22, 1945 |
| 2,429,420 | McMaster | Oct. 21, 1947 |
| 2,467,084 | Gannon | Apr. 12, 1949 |

FOREIGN PATENTS

| Number | Country | Date |
|---|---|---|
| 346,825 | Great Britain | Apr. 16, 1931 |